Nov. 20, 1923.
W. H. SPIRE
DRAG LINK
Filed Aug. 2, 1921
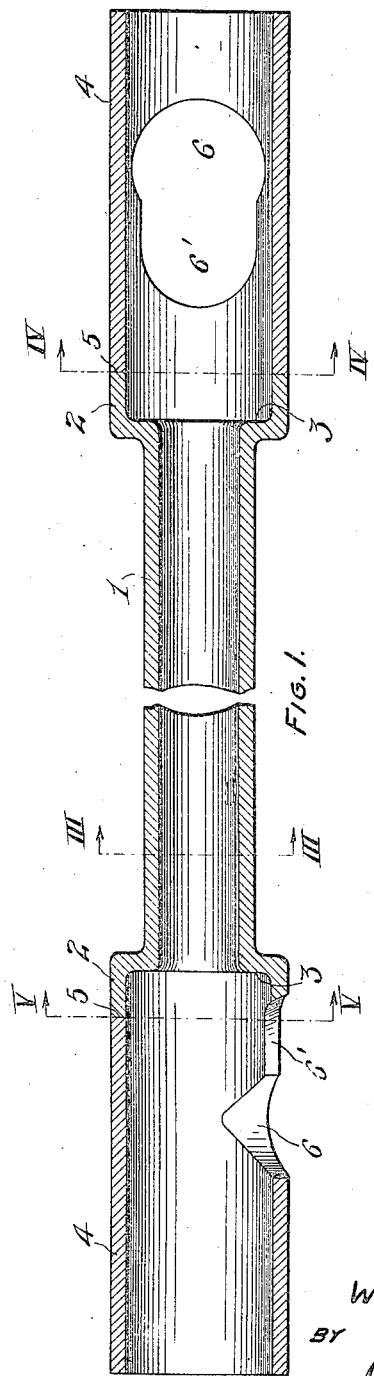
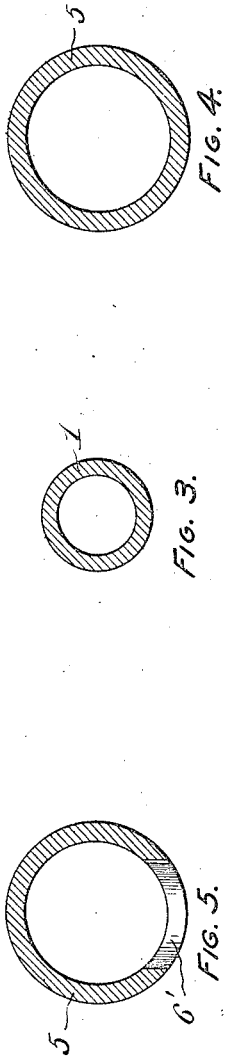
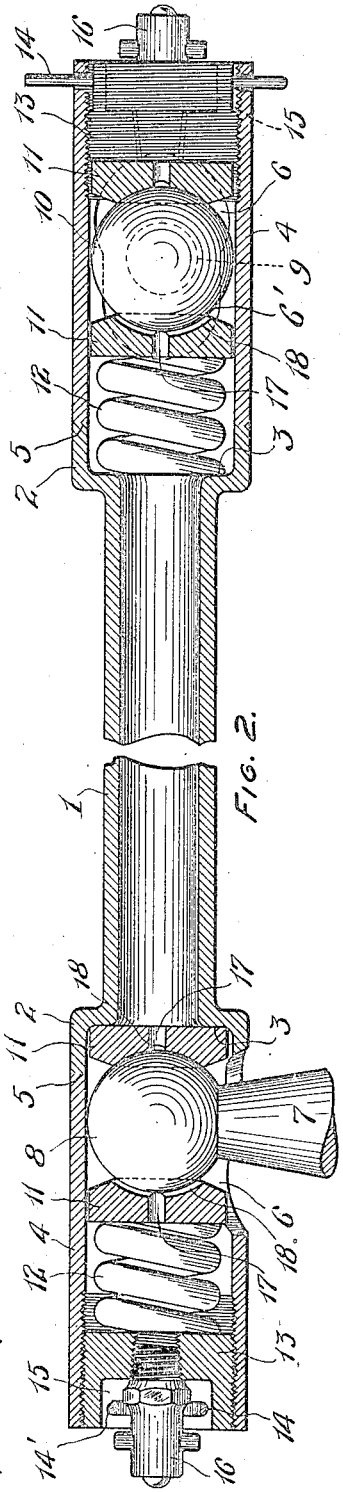
INVENTOR:
WILLIAM H. SPIRE
BY
ATTORNEY Patented Nov. 20, 1923.

1,474,854

UNITED STATES PATENT OFFICE.

WILLIAM H. SPIRE, OF CLEVELAND, OHIO, ASSIGNOR TO THE STEEL PRODUCTS COMPANY, OF CLEVELAND, OHIO, A CORPORATION OF OHIO.

DRAG LINK.

Application filed August 2, 1921. Serial No. 489,865.

*To all whom it may concern:*

Be it known that I, WILLIAM H. SPIRE, a citizen of the United States, resident of Cleveland, county of Cuyahoga and State of Ohio, have invented new and useful Improvements in Drag Links, of which the following is a specification, the principle of the invention being herein explained, and the best mode in which I have contemplated applying that principle, so as to distinguish it from other inventions.

My invention relates to drag links for use as a part of the steering mechanism of automobiles, and particularly to apparatus of this character of the welded type. My invention also relates to drag links of the floating type, i. e., the bearings are free to float inside the usual end sockets and conform to any irregularities of the steering arm and axle arm balls. The object of the invention is to provide a welded link in which difficulties due to weakness occasioned by the welding and due to flaws in the welding are largely eliminated. This is accomplished in general by providing the welding plane in a comparatively large section of the link.

The annexed drawing and the following description set forth in detail certain means embodying my invention, the disclosed means, however, constituting but one of the various mechanical forms in which the principle of the invention may be employed.

In said annexed drawings:

Figure 1 represents a central vertical section through a piece of tubing and associated welded pieces of tubing formed into my improved drag link;

Figure 2 represents a central vertical section of the completely assembled link, suggesting also the usual steering arm and axle arm connections; and Figures 3, 4 and 5, represent transverse vertical sections, taken in the planes indicated by the lines III—III, IV—IV, V—V, respectively, Figure 1.

Referring to the annexed drawing in which the same parts are indicated in the several figures, respectively, by the same ordinals, a piece of steel tubing is indicated by the ordinal 1, whose ends 2 have been upset and then expanded so that said expanded ends have a wall thickness equal to the wall thickness of the original piece of tubing 1. Shoulders 3 are thus formed which serves as seats for the mechanism usually associated with the steering arm and axle arm connections and which will be hereinafter more fully mentioned. These operations are performed in a hot upsetting and forging machine and three or four operations are required.

To these ends 2 are butt-welded sections 4 of tubing of the same outside diameter and wall as the ends 2 after the latter have been upset and expanded. The welding area is indicated by the ordinal 5. These pieces 4 of tubing thus welded to the ends 2 serve, with the ends 2, as the usual end sockets of the link. These sockets 4 are provided with the usual holes 6 for the reception of the ball and steering axle arm connections, these holes have the restricted parts 6' whereby in the assembled link the ball arms are prevented from dropping off.

The steering and axle arms are indicated by the ordinals 7 and 9 respectively, having the balls 8 and 10, respectively, journaled in the bearings 11, the usual springs 12 formed from rounded spring steel in the customary manner being also provided. The steering and axle arms and the associated mechanism are retained in the sockets 4 by means of plugs 13 which are counter-bored, drilled and tapped for the accommodation of grease cups 16, said plugs 13 being held rigidly relatively to the sockets 4 by means of the cotter-pins 14. The counter-bored portion of the plugs 13 are indicated by the ordinal 15 and, in order that provision may be made for the transverse intersection of the plugs 13 by the cotter-pins 14, and also for the central threading of the grease cups 16 into the plugs 13, I have spread the arms 14' of the cotter pin 14 through the counter-bored portion 15 of the plugs 13 in arcs above and below the grease cups 16, as plainly shown in the left hand end of Figure 2. The bearings 11 are provided with center holes 17 and communicating internal transverse grooves 18 for effectively passing the lubricant to the balls 8 and 10 and uniformly distributing the same on the surfaces thereof.

The usual method heretofore in welding the end sockets to the body portion of the link has been to swage comparatively large sections of tubing down to the size of the intermediate tubing and then weld the smaller inner ends of the sections of the intermediate tube. This weld was therefore in a comparatively small section and weaknesses occasioned by the weld were much more liable to be fatal than is true in my new and improved construction shown in the accompanying drawing, heretofore described and hereinafter claimed, in which the welding area is in the largest section of the tube. Even in the case of the steering arm end of the tube, wherein the welding area intersects the smaller portion 6' of the ball entry 6, due to the relative arrangement of the spring and bearings in the left hand socket 4, Figure 2, still, the solid material in this welding area is greater than would be the solid material in any welding area through the smaller intermediate tube 1.

What I claim is:

1. A drag link consisting of a piece of tubing expanded at the end to form an internal shoulder providing a seat and an expanded end in the form of a short cylindrical flange of greater diameter than said tubing; and a second piece of tubing, of the same outside diameter as said expanded end, butt-welded to said end to form an end socket.

2. A drag link consisting of a piece of tubing upset and expanded at the end to form an internal shoulder providing a seat and an expanded end in the form of a short cylindrical flange of greater diameter than said tubing, the wall of said expanded end being of the same thickness as the original tubing; and a second piece of tubing, of the same outside diameter and wall thickness as said expanded end, butt-welded to said end to form an end socket.

3. A drag link consisting of a piece of tubing upset and expanded at its ends to form internal shoulders providing seats and expanded ends in the form of short cylindrical flanges of greater diameter than said tubing, the walls of said expanded ends being of the same thickness as the original tubing; and other pieces of tubing, of the same outside diameter and wall thickness as said expanded ends, butt-welded to said ends to form end sockets.

Signed by me this 27th day of June, 1921.

WILLIAM H. SPIRE.